United States Patent Office 3,329,956
Patented July 4, 1967

3,329,956
CORRELATION DIRECTION FINDER SYSTEM
James W. Caspers, San Diego, Calif., assignor to the United States of America as represented by the Secretary of the Navy
Filed July 21, 1964, Ser. No. 384,273
3 Claims. (Cl. 343—119)

The invention described herein may be manufactured and used by or for the Government of the United States of America for governmental purposes without the payment of any royalties thereon or therefor.

The present invention relates to a correlation direction finding system and more particularly to a direction finding system utilizing correlation techniques in fixing the positions of jamming sources through triangulation.

An effective radar counter countermeasure against the countermeasure of jamming and deceptive jamming is the combination of active and passive radar. The jamming sources are usually located by angular data alone although propagation time differentials may be used. Fine angular resolution is required, especially in the $\theta$—$\theta$ methods which use only angular data. If a three dimensional system is used, improved angular resolution improves the ghost probem in that two small beams are much less likely to falsely intersect.

The usual direction finding equipment for this purpose employs directional antennas which indicate the jammers direction at maximum signal strength. Because of conventional beam shapes this is not as sensitive to direction as desired because of the rounded or blunt shape of the antenna pattern. Navigational type direction finders obviate the shortcoming by operating on a null principle wherein the indication is sharp. In such a case, by using a selective or tuned receiver little difficulty is caused by unwanted signals. In the jamming environment however, jamming signals or other signals in the warfare environment, may be picked up by the antenna and prevent the null location of the desired signal.

An object of the present invention is to provide an improved direction finding system.

A further object of the present invention is to provide an improved direction finding system which rejects unwanted or jamming signals.

Another object of the present invention is to provide an improved direction finding system utilizing correlation techniques to reject jamming signals or other signals in a warfare environment.

Other objects and many of the attendant advantages of this invention will be readily appreciated as the same becomes better understood by reference to the following detailed description when considered in connection with the accompanying drawings wherein.

For the purposes of discussing the technique utilized, the two dimensional case is discussed. However, a generalization to the three dimensional case based on the same concept may be readily understood. In the case of the three dimensional system, improved angular resolution improves the ghost problem due to the fact that two small beams are much less likely to falsely intersect as may occur when two or more targets or sources of signals are being observed by receivers which are spacially disposed relative to each other and both receivers are not directed to the same target.

The technique described is devised to use the navigational null principle to obtain fine annular resolution and by correlation methods reject unwanted signals from near-by jamming sources or signals from the warfare environment.

Figure 1:
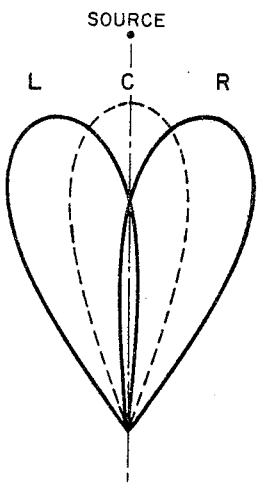
FIG. 1 is a schematic illustration showing the formation of typical beam patterns.

Three beams are utilized as shown in FIG. 1. These may be formed by one or more antennas, or one phased array could form all three beams. The beams correspond to a left (L), right (R) and center (C) beam, the center beam lying between the left and right beams. In the example of FIG. 1, the point labeled "Source" represents the desired direction to be found while the point labeled "Source" is intended to represent the unwanted signal or jamming signal.

If there were no interference, antenna beams L and R could be scanned together with some displacement until the signal strength received by both were the same. The signal source would then lie on a vertical plane passing through the antenna center at the point where the beam patterns L and R intersect. This approximates very much the usual null method except that the antenna pattern is modified.

Figure 2:
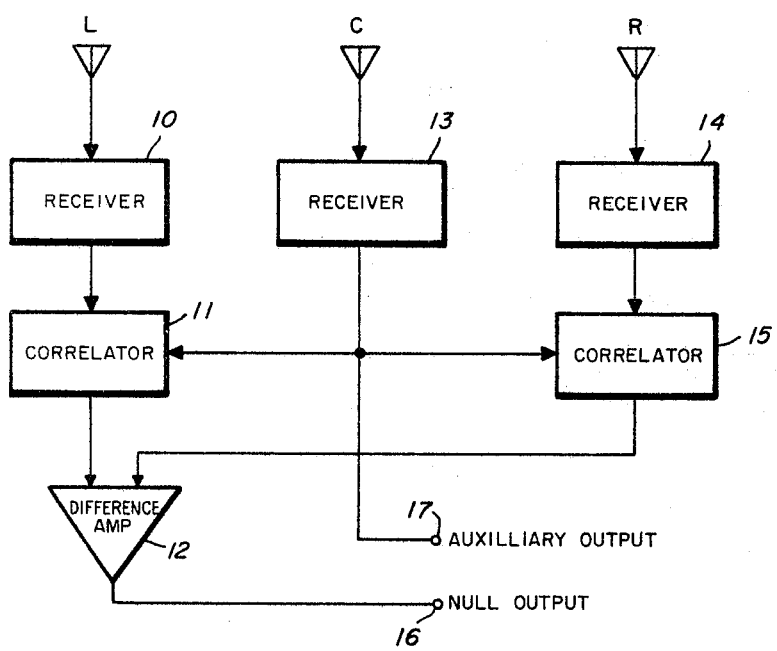
FIG. 2 is a schematic block diagram of a specific embodiment of the invention.

Now consider the following system as set forth in FIG. 2 which shows an antenna L, an antenna C and antenna R corresponding to left, center, and right. The left antena is coupled to a receiver 10 and the output of the receiver is coupled to a correlator 11 which, in turn, is coupled to a difference amplifier 12. The center antenna is coupled to a receiver 13 while the right antenna is coupled to a receiver 14 the output of which is coupled to a correlator 15. The output of correlator 15 is also coupled to the difference amplifier 12 and the output of the difference amplifier 12 is taken at 16 as a null output. In addition, the output of receiver 13 is coupled as an input to correlator 11 and correlator 15 and also is coupled to an output 17 as an auxiliary output.

FIG. 2 illustrates three antennas, however, it is to be understood that the three antennas might correspond to one antenna which is phased to form three beams. Each beam is processed by an appropriate receiver 10, 13 and 14 respectively, for the signal under surveillance. The two correlators 11 and 15, i.e. multipliers, may also include an averaging circuit however, this is not shown in that this is quite conventional. The differential amplifier 12 amplifies the difference, if any, between the correlator outputs.

The auxiliary output at 17 from the center antenna receiver indicates when the center beam is on target. The output of this receiver is correlated with the outputs of the receivers 10 and 14 in correlators 11 and 15, respectively, to reject signals that are off to either side. When the output of the two correlators is the same, then the principal axis of the combined beam array is directed at the signal source. A signal picked up by antenna R, for example, would be removed by the correlation process and not effect the direction indication. That is, a jamming signal received upon antenna R would be removed by the correlation process and would not effect a direction indication in that there is no output from the correlator 15, for example, unless the outputs from receivers 13 and 14 are the same.

The receivers may be any appropriate passband receiver as is conventional which amplifies the desired signal as much as possible and rejects unwanted signals. The receivers would provide a rejection process based on very sharp frequency selection while the correlation process would depend on a signal matching and might be either coherent or noncoherent. The null output from difference amplifier 12 which is obtained when the output of correlators 11 and 15 is present could be observed on an appropriate indicator, not shown, or be used in a servo system to automatically direct the beams.

The present system and technique could apply to active radar, communication links such as microwave links, or any application where hyperfine angular resolution is required.

Obviously many modifications and variations of the present invention are possible in the light of the above teachings. It is therefore to be understood that within the scope of the appended claims the invention may be practiced otherwise than as specifically described.

What is claimed is:
1. A correlation direction finder system comprising;
   an antenna means for forming a plurality of receiving beam patterns;
   said beam patterns corresponding spatially to at least a left, center, and right pattern;
   said beam patterns being directional;
   separate correlation means associated at least with said left and right beam patterns and operatively receiving said signals corresponding to said left and right beam patterns;
   said separate correlation means also receiving a signal corresponding to said center beam pattern;
   said separate correlation means producing an output when signals received on said left and right and center beam patterns are identical and rejecting signals that are not received on said left, right and center beam patterns.
2. A correlation direction finder system as set forth in claim 1 and further including;
   difference amplifier means operatively connected to said separate correlation means for providing a null output when equal outputs from said correlation means are introduced to the input to said difference amplifier.
3. The method of determining the location of a received radio signal comprising;
   forming at least three antenna beam patterns;
   directing said patterns approximately toward the source of received signals;
   said beam patterns corresponding to a left, right and center beam;
   correlating the received signal from the left and center beam patterns;
   correlating the received patterns from the right and center beam patterns;
   said correlation operating to reject spurious signals not present at the combination of pairs comprising left center and right center beam patterns; and
   comparing the output of said correlators to determine if a null is present and if not present, directing the received beam patterns until a null output is achieved.

References Cited
UNITED STATES PATENTS 3,028,600    4/1962    Bailey _____ 343—113
3,154,778   10/1964    Kock.

RODNEY D. BENNETT, *Primary Examiner.*

CHESTER L. JUSTUS, *Examiner.*

R. E. BERGER, *Assistant Examiner.*